United States Patent [19]

Warren et al.

[11] 4,150,814

[45] * Apr. 24, 1979

[54] ELECTRIC FENCE POST AND INSULATOR HOLDER

[76] Inventors: Ruth D. Warren; Stephen F. Warren, both of 115 N. Pine, Pratt, Kans. 67124

[ * ] Notice: The portion of the term of this patent subsequent to Oct. 24, 1994, has been disclaimed.

[21] Appl. No.: 524,070

[22] Filed: Nov. 15, 1974

[51] Int. Cl.[2] ............................................. A01K 3/00

[52] U.S. Cl. ...................................... 256/10; 174/154; 174/158 F

[58] Field of Search .............. 256/10; 174/154, 158 F, 174/161 F, 163 F

[56] References Cited

U.S. PATENT DOCUMENTS

| | | | |
|---|---|---|---|
| 2,429,857 | 10/1947 | Verner | 174/161.2 |
| 2,438,419 | 3/1948 | Schmidt | 174/163 F |
| 2,610,224 | 9/1952 | Norris | 174/163 F |

FOREIGN PATENT DOCUMENTS

| | | | |
|---|---|---|---|
| 1194237 | 3/1959 | France | 174/163.2 |
| 54837 | 3/1968 | Poland | 174/163 F |

*Primary Examiner*—Werner H. Schroeder
*Assistant Examiner*—Doris L. Troutman

[57] ABSTRACT

A fence post and an insulator holder for an electric fence. A post has an insulator holder mount on its normally upper end portion. An insulator holder is mountable with the post in a depending relation. An insulator is mounted in the insulator holder and it in turn mounts a wire. The fence post and insulator holder is constructed and adapted to be used with other similar fence posts, insulator holders, insulators and a wire to form an electric fence. In the fence the posts are positioned in an alternating fashion on opposite sides of the wire. The insulator holders are positioned in an opposed relation on opposite sides of the line of the fence and insulators mount the wire.

12 Claims, 6 Drawing Figures

ELECTRIC FENCE POST AND INSULATOR HOLDER

BACKGROUND OF THE INVENTION

The invention is related to electric fences and specifically to fence posts and insulator holders for electric fences. Numerous types of electric fence post structures and insulator holder structures are known in the prior art and are operable to support a wire in an electric fence. However, these prior art electric fence posts and insulator holders are sometimes difficult to set up in the field because the wire must be pulled very tight so it will not sag between the posts and tightening of this wire is usually difficult. The prior art fence post, insulators, and insulator holders are constructed to support the wire in a line on one side of the posts and to grip the wire to prevent if from sliding in the insulator. Some of the prior art insulators are constructed with an aperture to hold the wire in a passageway leading to the aperture which is inclined relative to the aperture so that the wire can be passed through the passageway into the aperture and be retained in it. This type of insulator is common and it has a tendency to cling to the wire as it is tightened thus bending the post as the wire is tightened and making it difficult and time consuming to tighten the wire. When a fence having this type of structure is set up the wire must be initially tightened then the posts repositioned on the wire and the wire tightened again so that in the end the wire is extremely tight. Because an electric fence of this type has the wire stretched extremely tight the post will be subjected to considerably large side forces where it is set up to surround a field which has a tendency to bend the posts and in some cases break the insulators.

SUMMARY OF THE INVENTION

In a preferred specific embodiment, an electric post and insulator holder includes a post which has a mount on its normally upper end portion to mount an insulator holder, an insulator holder removably mountable with the post and having an insulator mounted therewith. The insulator holder is supported from the post in a depending relation and the insulator has a slot therethrough which is open on one side and the ends of the insulator to receive and hold a wire. The insulator is positioned with the slotted side toward the post when the insulator holder is mounted on the post. The fence post and insulator holder of this invention are constructed and adapted to be used with other similar posts and insulator holders and a wire to form an electric fence with the posts positioned in alternating fashion on opposite sides of the wire and the insulator holders positioned in a facing relation toward the line of the fence with the insulators supporting the wire.

The fence post and insulator holder are constructed in one embodiment with the post having a notched lug and the insulator holder having an aperture to receive and pass the post and a notch portion to receive and pass the lug. Mounting of the insulator holder with the fence post is done by passing the post through the major portion of the aperture and the lug partially through the notch portion of the aperture then rotating the post in the insulator holder when it is positioned at the notch so the lug secures the vertical motion of the insulator holder on the fence post.

The electric fence post and insulator holder are constructed in another embodiment wherein the normally upper end portion of the fence post has a substantially roughened surface and the insulator holder has an aperture that is sized slightly larger than the fence post so the fence post can be passed through the aperture. In mounting the insulator holder on the fence post the post is passed through the aperture in the insulator holder and positioned at a point on the roughened surface whereupon it is positioned in angular relation relative to the fence post. Friction of the roughened surface and the insulator holder retains the insulator holder in depending relation on the fence post.

One object of this invention is to provide an electric fence post and insulator holder structure overcoming the aforementioned disadvantages of the prior art devices.

Still, one other object of this invention is to provide an electric fence post and insulator holder structure which can be used to construct an electric fence wherein the fence posts are placed on opposite sides of the wire in an alternating fashion and the insulator holders mount insulators which support the wire.

Still, another object of this invention is to provide an electric fence post and insulator holder structure which is constructed to have the insulator holder easily removably mountable in a depending relation with the upper end portion of the post. The insulator holder mounts an insulator that has a slot therethrough to receive and hold a wire.

Various other objects, advantages, and features of the invention will become apparent to those skilled in the art from the following discussion, taken in conjunction with the accompanying drawing, in which:

Figure 5:
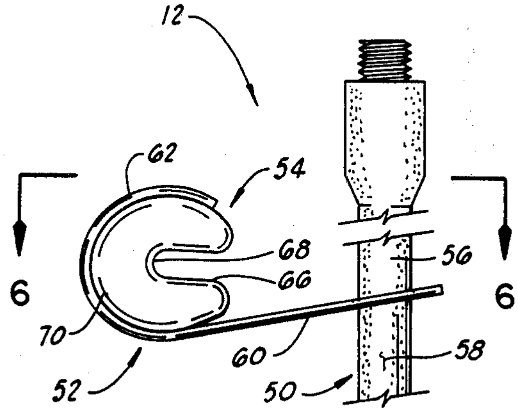
FIG. 5 is an elevation view of an upper end portion of another embodiment of the fence post and insulator holder of this invention.

The following is a discussion and description of preferred specific embodiments of the electric fence post and insulator holder structure of this invention, such being made with reference to the drawings, whereupon the same reference numerals are used to indicate the same or similar parts and/or structure. It is to be understood that such discussion and description is not to unduly limit the scope of the invention.

DESCRIPTION OF PREFERRED EMBODIMENT

Figure 6:
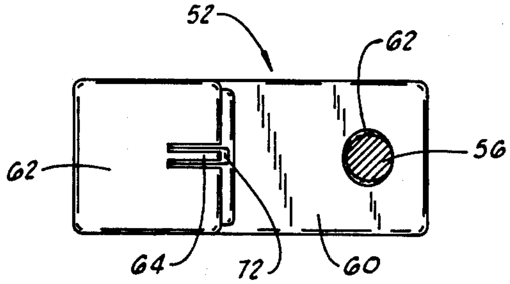
FIG. 6 is a top view of the fence post, insulator holder, and insulator shown in FIG. 5 with the view taken on line 6—6 of FIG. 5.
Figure 4:
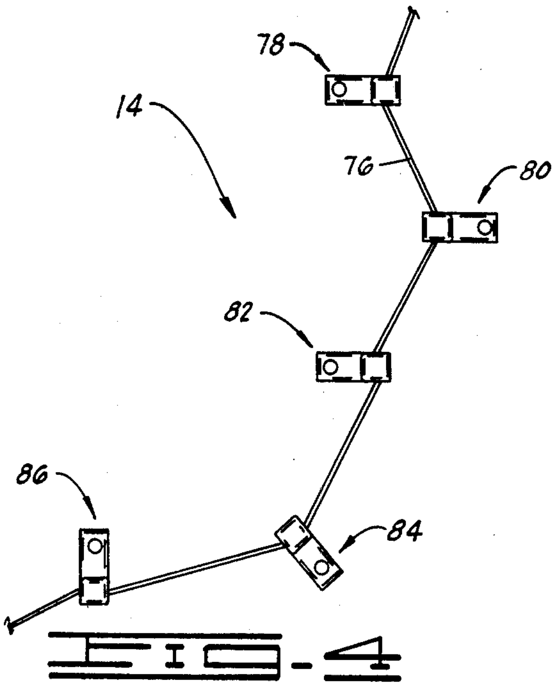
FIG. 4 is a plan view of a portion of an electic fence using the fence post and insulator holder of this invention.
Figure 1:
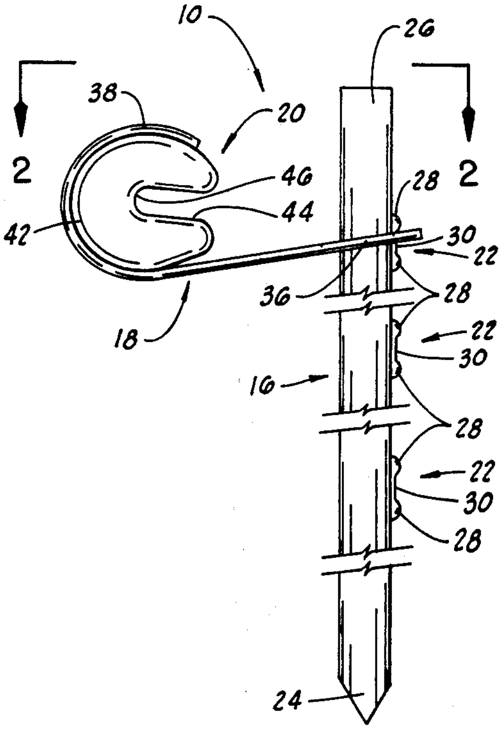
FIG. 1 is an elevation view of an embodiment of the fence post and insulator holder together with the insulator holder having an insulator mounted therein. The fence post is shortened vertically for clarity.

The electric fence post and insulator holder of this invention are disclosed herein in two specific embodiments thereof. One embodiment, (1), of the electric fence post and insulator holder is shown in FIG. 1 and indicated generally at 10. Another embodiment, (2), of the electric fence post and insulator holder structure of this invention is shown in FIGS. 5 and 6 and indicated generally at 12. Both embodiments of this invention function similarly to form an electric fence as shown in FIG. 4 wherein the posts are arranged on opposite sides of the fence wire in an alternating fashion and the wire is strung between the insulators in a zig zag manner. In the fence 14 the posts are on opposite sides of the fence line in a spaced and alternating position arrangement.

Figure 2:
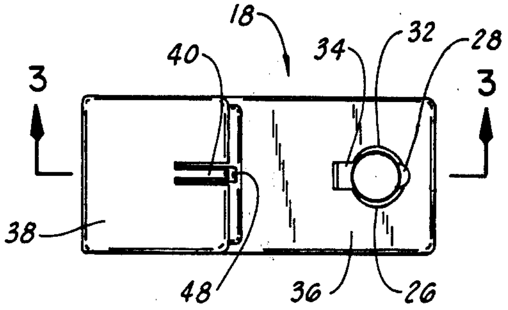
FIG. 2 is a view of the fence post and insulator holder shown in FIG. 1 with the view taken on line 2—2 of FIG. 1.
Figure 3:
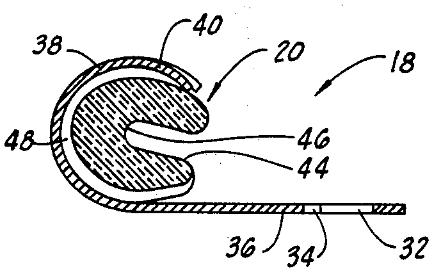
FIG. 3 is a sectional view of the insulator holder with an insulator therein taken from the position indicated by line 3—3 of FIG. 2.

FIGS. 1-3 show an embodiment, (1), of the electric fence post and insulator holder of this invention wherein the post is indicated generally at 16, the insulator holder is indicated generally at 13, and the insulator is indicated generally at 20. The post 16 is an elongated member and has a plurality of lugs 22 on its normally upper end portion. The lower end portion of the post 16 is provided with a pointed or tapered end portion for aiding in insertion into the ground. Preferably, the upper end portion 26 of the post which has lugs 22 is cylindrical and has a substantially round cross section. The lugs 22 are all constructed similarly and are rigidly secured to the post's upper end portion 26 in a line aligning with the elongated axis of the post in a spaced relation with the uppermost lug being slightly below the upper end of the post. Each of the lugs 22 has a raised portion 28 on its ends and a notch portion 30 in its center portion. The notch portion 30 in the lug can be of a depth so that the bottom of the notch aligns with the perimeter of the exterior of the upper end portion 26 or it can be slightly shallower. FIGS. 1 and 2 show the notch portion 30 being relatively shallow so it does not align with the post's perimeter.

Preferably, the lugs 22 are welds on the post upper portion 26 wherein the welding rod forms the raised portion of the lug and the notch 30 is formed by grinding the weld. In practice, the lugs 22 have been constructed in this manner and such has been found to be very satisfactory. The post 16 is preferably constructed with three of the lugs on its upper end portion 26 to provide for varying the height of the fence wire above the ground. One advantage to having a plurality of lugs 22 on the post is that the fence wire can be supported at a substantially uniform distance above the ground when the fence is erected where it may be necessary to insert some of the posts farther into the terrain than others in order for the posts to be rigidly supported.

The insulator holder 18 has a mount on one end portion thereof to mount same with the post 16 and a mount on the opposite end thereof to mount the insulator 20. The insulator holder 18 is preferably constructed from a relatively thin flat member as shown in the drawings. However, the insulator holder can be constructed from differently shaped material if desired. The mount for the post 16 has an aperture 32 through one end of the thin flat member with a notch 34 in the aperture. The notch 34 is positioned in the direction of the insulator mounting end portion of the insulator holder 18 and it is sufficiently large to pass the lugs 22. The aperture 32 is preferably essentially round and sized slightly larger than the exterior of the post's upper end portion 26. To mount the insulator holder 18 with the post 16 the upper end of the post is passed through the aperture 32 and the lugs 22 are aligned to pass through the notch 34. When the center portion of a lug is aligned with the notch 34 the insulator holder is rotated relative to the post 16 so the recessed portion 30 of the lug 22 moves in the aperture 32 to a position where it does not align with the notch 34. FIG. 2 shows the preferred mounted relation of the post and the insulator holder 18. When an insulator holder 18 is mounted on the post 16 and the post is positioned in an essentially vertical upright position the insulator holder 18 will hang in a depending relation as shown in FIG. 1. In FIG. 1 the essentially flat post mounting end portion 36 of the insulator holder 18 is angularly disposed downward relative to the post 16.

The insulator mounting end portion of the insulator holder 18 has an arcuate or curved portion which partially encircles the insulator 20. The insulator holder 18 is preferably constructed of a rigid, yet resilient material so the arcuate or curved portion 38 can have an unrestrained curvature slightly small than the curvature of the exterior of the insulator 20 so that it will act as a clamp to hold the insulator in place. A tongue 40 is integrally formed in the end portion of this arcuate or curved portion 38 and it is used for retaining the insulator. The insulator 20 has an arcuate or curved outer portion 42 and a notch 44 opening on one side thereof and on the ends thereof. The insulator 20 has a generally C-shaped cross section. The notch 44 extends completely through the center portion of the insulator and opens on one side and to the ends. The notch 44 has a closed portion 46 generally centrally positioned relative to its curved portion 42. The insulator 20 has a groove 48 in a central portion of the exterior thereof which extends around the arcuate or curved portion 42. The tongue 40 of the insulator holder is bent to engage the groove 48, this aids in retaining the insulator 20 in the insulator holder 18. FIG. 3 shows a sectional view of the insulator 20 mounted in the insulator holder 18 wherein the tongue 40 is shown in the groove 48 in the upper portion of the figure. It is clearly shown in FIG. 3 that the insulator groove 48 extends around the curved perimeter of the insulator 20. Preferably, the insulator 20 is constructed of a material that has good electrical insulating properties, such as a ceramic or plastic material. In practice, the insulator 20 which has been used is one type of insulator that is commonly used in electric fences and positioned at the corner or end of the fence wire. The insulator which has been used is constructed of a ceramic material.

Another embodiment, (2), of the electric fence post and insulator holder is shown in FIGS. 5 and 6 wherein the fence post is indicated generally at 50, the insulator holder is indicated generally at 52 and the insulator is indicated generally at 54. The insulator holder 52 mounts on the upper end portion of the post 50 in a depending relation as shown in FIG. 5. The fence post 50 is an elongated member which has tapered end or point on its lower end portion (not shown in the drawings). The upper end portion 56 of the fence post 50 has a substantially roughened surface indicated at 58. The upper end portion 56 is essentially round in cross section. In practice a fence post has been constructed from a used sucker rod from an oil well. A sucker rod is the pump operating rod mounted inside the casing of a producing oil well. Sucker rods after they have been used for a period of time become pitted in their outer surface and quite rough therefore they are particularly well suited for use in this invention. The fence post shown in FIG. 5 has the male coupling end portion of a sucker rod shown on the upper end thereof.

The insulator holder 52 has a mount on one end portion thereof to mount same with the fence post 50 and a mount on the opposite end thereof to mount the insulator 54. Preferably, the insulator holder 52 is constructed of a relatively thin flat member 60 with the mount for the fence post 50 being an aperture 60 through one end portion thereof as shown. The aperture 62 is essentially round and sized slightly larger than the exterior of the fence post's elongated portion 56 so that it can pass through the aperture 62. When the insulator holder 52 is mounted with the fence post 50 on the upper end portion thereof it is supported in a depending relation as shown in FIG. 5. When mounted, the insulator holder 52 is suspended on the fence post's upper end portion 56 with the fence post mounting end portion thereof being angularly disposed relative to the elongated axis of the fence post 50. The insulator mounting end has an arcuate or curved portion 62 which is curved to closely conform to the exterior shape of the insulator 54. The insulator holder 52 is preferably constructed of a rigid yet a resilient material so the arcuate or curved portion 62 can have an unrestrained curvature slightly smaller than the curvature of the exterior of the insulator 54 so that it will act as a clamp to hold the insulator in place. The end portion of the arcuate or curved portion 62 has a tongue 64 interally formed in the center portion thereof to engage a groove in the insulator 54.

The insulator 54 has a generally C-shaped cross section with a slot 66 therethrough opening to one side thereof and to the ends thereof. The closed end portion of the slot 66 is indicated generally at 68 and it is generally centrally positioned relative to the insulator's curved or arcuate exterior portion 70. The insulator 54 has a groove 72 in the curved or arcuate portion 70 in the center portion thereof. When the insulator 54 is mounted in the insulator holder 52 the tongue 64 is bent so that it extends into the groove 72 to aid in retaining the insulator in the insulator holder 52. In practice, the insulator 54 which has been used with this invention is an insulator normally used with electric fences and positioned at the end or corner of the fence on to secure the end of the fence wire. Preferably, the insulator 54 is constructed substantially as shown and made from a material which has good electrical insulating properties such as ceramic materials, plastics, etc. In practice, the insulator used was constructed of a ceramic material.

FIG. 4 shows a portion of the electric fence of this invention with such indicated generally at 14. The portion of the fence shown in FIG. 4 illustrates a section of a fence line and a corner. The fence portion 14 has a wire 76 and a plurality of fence post and insulator holder assemblies indicated generally and individually at 78, 80, 82, 84, and 86. The fence post assemblies 78, 80, and 82 illustrate the arrangement of the fence of this invention in a section wherein the fence is erected along a fence line between two points. The fence post assemblies 78, 80, and 82 are positioned in an alternating relation on opposite sides of the fence line and substantially spaced from the fence line so the wire 76 is strung between the insulators thereof in a zig zag manner crossing the fence line and connecting the several fence post assemblies. The fence post assemblies of the fence 14 are positioned as shown with the insulator holders facing the fence line and the posts being outwardly positioned relative to the fence line and the insulator holders. The fence post assemblies 82, 84, and 86 illustrate the arrangement of the fence of this invention at a corner wherein the cornermost fence post assembly 84 has the post thereof on the outer portion of the corner and the two adjacent fence post assemblies 82 and 86 of the post thereof on the inner portion of the corner so the wire 76 is supported between the insulators substantially as shown.

An important advantage of the fence of this invention is that the tension in the fence can be easily adjusted by adjusting the relative position of the fence post assemblies thereof. When the fence of this invention is initailly set up the fence wire can be pulled so that the slack is removed relatively easily. Then its selected places along the fence, depending on the particular fence, one or more of the fence post can be removed from the ground and moved outward relative to the fence line or moved away from adjacent the fence post assemblies and reinserted in the terrain to increase the tension in the wire to the desired amount. The decrease the tension in the wire one or more of the fence post assemblies is moved toward the fence line or toward the adjacent fence post assemblies. It is to be noted that should the fence wire in the fence of this invention become slackened during use it will not necessarily drop from the insulators and be shorted if the fence wire is bumped into or moved. When the fence wire is bumped into or moved it will automatically tighten the wire in the adjoining fence post assemblies because the wire can easily slide in the insulators.

In the manufacture of the fence post and insulator holder structures of this invention it is seen that same can be easily constructed to achieve the end product. Because of the simplicity of the structures they can be easily fabricated in a mass production fashion. The insulators which have been used in practice of this invention are a usual or standard hardware type item thus easily obtainable.

In the use and operation of the electric fence post and insulator holder structure of this invention it is seen that same provides a novel electric fence structure. Either of the herein disclosed embodiments of the electric fence post and insulator holder function similarly in the novel electric fence to support an electric fence wire. The electric fence post assemblies are easily installed and set up for use. The insulator holder is vertically adjustable relative to the ground when the post is set to provide for supporting the fence wire at a uniform distance above the ground.

As will become apparent from the foregoing description of the Applicant's electric fence post and insulator holder structure, a relatively inexpensive and simple means have been provided to construct a novel electric fence. The fence post and insulator holders are simple to construct and easy to assemble for use. The fence post assemblies are easily installed and can be easily positioned or repositioned as necessary to adjust the tension in the novel electric fence. Additionally, the electric fence post and insulator holders of this invention are constructed so that they can be easily assembled when the fence is being set up and disassembled when the fence is taken down.

While the invention has been described in conjunction with preferred specific embodiments thereof, it will be understood that this description is intended to illustrate and not to limit the scope of the invention, which is defined by the following claims:

We claim:

1. A fence post and insulator holder for an electric fence, comprising:

(a) a post having a ground engaging portion on one end and a means to mount an insulator holder on an opposite normally upper end portion, (b) an insulator holder having a means to mount an insulator on one end portion thereof and having an aperture through its opposite end portion to receive said post and constructed and adapted to be mounted in depending relation on said post, (c) an insulator mounted in said means to mount an insulator, said insulator having means to mount a wire, said fence post and insulator holder being constructed and adapted to be used with other similar fence posts and insulator holders and a wire to form an electric fence along a fence line wherein said posts are positioned in an alternating fashion on opposite sides of the wire and said insulator holders are positioned in a facing relation toward the fence line with said insulators being mounted with the wire.

2. The fence post and insulator holder of claim 1, wherein:

(a) said means to mount an insulator holder has a lug rigidly secured to said post, said lug has a notch therethrough transverse to said posts, and (b) said aperture has a major portion to receive said post and a notch portion to receive and pass said lug.

3. The fence post and insulator holder of claim 2, wherein:

(a) said insulator holder has a rigid member with one end having said aperture and the other end having said means to mount an insulator, and (b) said post is essentially cylindrical in said normally upper end portion with said lug extending outward therefrom.

4. The fence post and insulator holder of claim 3, wherein:

(a) said means to mount an insulator has an arcuate portion of said insulator holder constructed and adapted to partially encircle said insulator, and (b) said insulator has a slot therethrough open on a side of said insulator and open on opposite ends of said insulator, said insulator being mounted with said side having said slot positioned toward said aperture.

5. The fence post and insulator holder of claim 4, wherein:

(a) said insulator has a groove in a mid portion thereof, said groove being transverse to said slot, (b) said insulator holder has a tongue member on said arcuate portion engaged in said groove, and (c) said post has a plurality of said lugs in a spaced relation thereon.

6. The fence post and insulator holder of claim 1, wherein:

(a) said means to mount an insulator holder has a roughened surface on said normally upper end portion of said post, and (b) said aperture is of a size larger than said normally upper end portion of said post to in use contact said roughened surface so said insulator holder is mounted in an angular depending relation to said post.

7. The fence post and insulator holder of claim 6, wherein:

(a) said insulator holder has a rigid member with one end having said aperture and the other end having said means to mount an insulator, and (b) said post is generally cylindrical in said normally upper end portion.

8. The fence post and insulator holder of claim 7, wherein:

(a) said means to mount an insulator has an arcuate portion of said insulator holder constructed and adapted to partially encircle said insulator, and (b) said insulator has a slot therethrough open on a side thereof and open on opposite ends thereof, said insulator being mounted with said side having said slot generally positioned toward said aperture.

9. The fence post and insulator holder of claim 8, wherein:

(a) said insulator has a groove in a mid portion thereof, said groove being transverse to said slot, and (b) said insulator holder has a tongue member on said arcuate portion engaged in said groove.

10. An electric fence, comprising:

(a) a plurality of posts positioned on opposite sides of a fence line in an alternating spaced relation, (b) a plurality of insulator holders mounted on said fence posts on the sides thereof adjacent to said fence line, said insulator holders each having a mount portion on one end portion thereof to mount said insulator holders with said posts and an arcuate portion on their opposite end portion, (c) a plurality of insulators mounted in the arcuate portion of said insulator holders, said insulators each having a slot therethrough opening to one side thereof and to the ends thereof, said insulators being mounted with said insulator holders having said slot opening toward the mount portion for said posts, and (d) a wire connected between said insulators in a zig zag fashion relative to said fence.

11. The electric fence of claim 10, wherein:

(a) said posts each have a plurality of lugs rigidly secured thereto, said lugs each have a notch therethrough transverse to said posts, and (b) said mount for said post of said insulator holders each have an aperture through said insulator holders and a notch in said aperture, said aperture being sized to receive and pass said post and said notch being sized to receive and pass said lugs.

12. The electric fence of claim 10, wherein:

(a) said post has a roughened surface on the upper end portion thereof, and (b) said mount for said post of said insulator holder has an aperture therethrough, said aperture being sized slightly larger than said upper end portion of said post to in use contact said roughened surface so said insulator holder is mounted in an angular depending relation on said upper end portion of said post.

* * * * *